United States Patent
Mattsson

[11] 3,798,765
[45] Mar. 26, 1974

[54] DEVICE FOR CUTTING TUBES

[76] Inventor: Alf Viktor Mattsson, Norra Gubberogatan 19 A, 416 63 Goteborg, Sweden

[22] Filed: Jan. 24, 1972

[21] Appl. No.: 220,217

[52] U.S. Cl. ................................. 30/96, 269/283
[51] Int. Cl. ............................. B23d 21/10
[58] Field of Search ............ 30/90.1, 92, 93, 94, 95, 30/96; 29/97; 82/43; 269/280, 283

[56] References Cited
UNITED STATES PATENTS

| | | | |
|---|---|---|---|
| 3,117,375 | 1/1964 | Meese | 30/96 |
| 18,918 | 12/1857 | Lloyd | 30/96 |
| 3,662,445 | 5/1972 | Whitaker | 29/97 |
| 1,663,866 | 3/1928 | Snapp | 269/280 X |

FOREIGN PATENTS OR APPLICATIONS

| | | | |
|---|---|---|---|
| 652,388 | 4/1951 | Great Britain | 30/96 |

Primary Examiner—Othell M. Simpson
Assistant Examiner—Mark S. Bicks

[57] ABSTRACT

A device for cutting tube shaped work pieces including pivoted clamp halves for surrounding a peripheral portion of the work piece and being clamped therearound without deformation of the work piece and a cutter extending radially of said clamp halves and being slideably mounted on said clamp halves while held in said radial position.

2 Claims, 7 Drawing Figures

DEVICE FOR CUTTING TUBES

The present invention relates to a device for cutting tube-shaped work pieces.

The main object of the invention is to provide a device which is well suited for tubular work pieces with a thin wall and which is inexpensive in manufacture and convenient to carry from one place of work to another.

The device according to the invention is mainly characterized in that it comprises a clamping member adapted to be attached around the work piece and a cutting tool being carried in said clamping member movable in the circumferential direction of the work piece.

This provides for a very even distribution of the clamping pressure around the work piece, thus eliminating the risk of deformation if the work piece during clamping and cutting. Another advantage with the device according to the invention is that it is independent of variations in the wall thickness of the work piece which can be for instance a PVC-tube.

Figure 1:
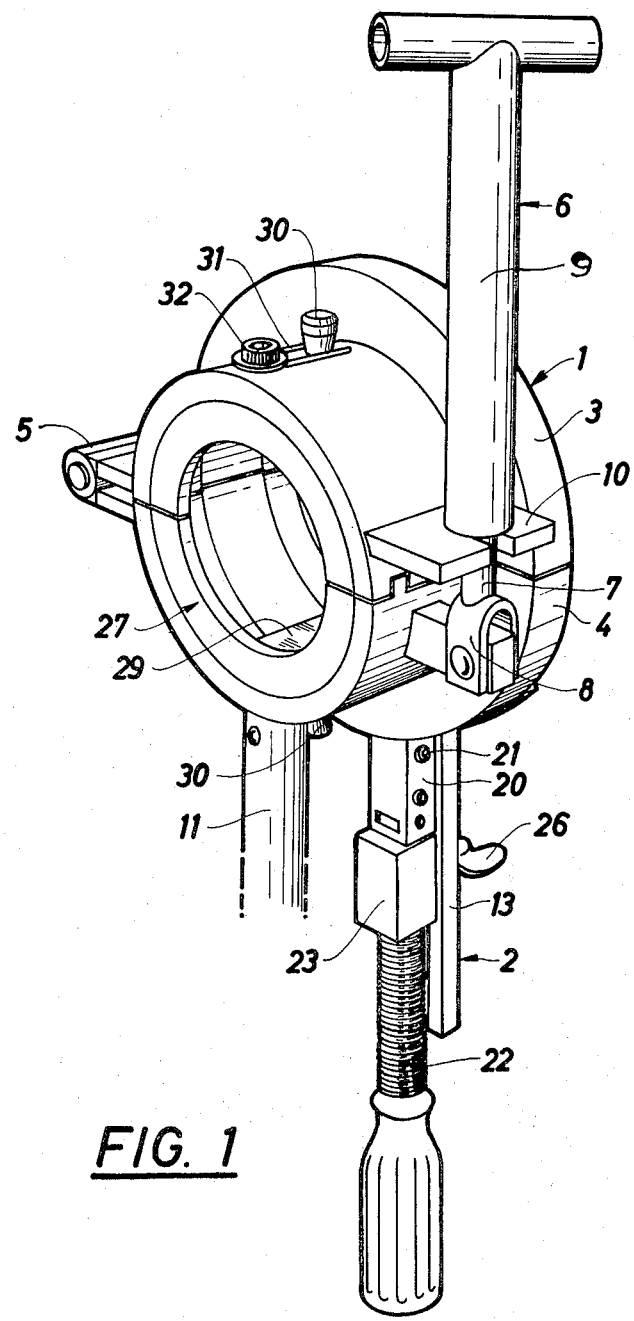
Figure 2:
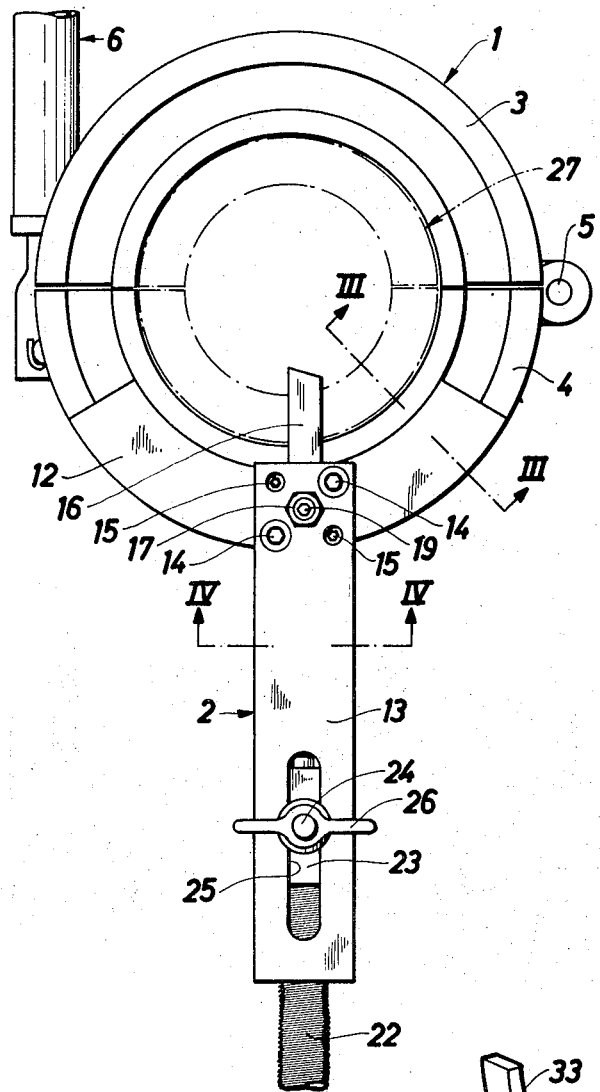
Figure 3:
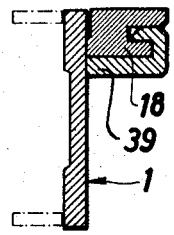
Figure 4:
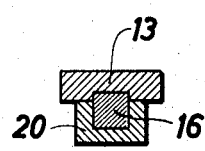
Figure 5:
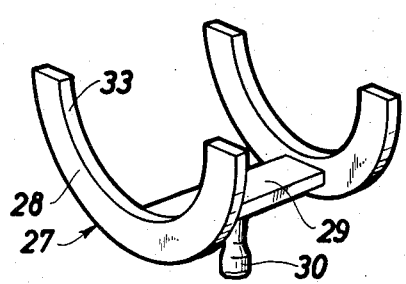
Figure 6:
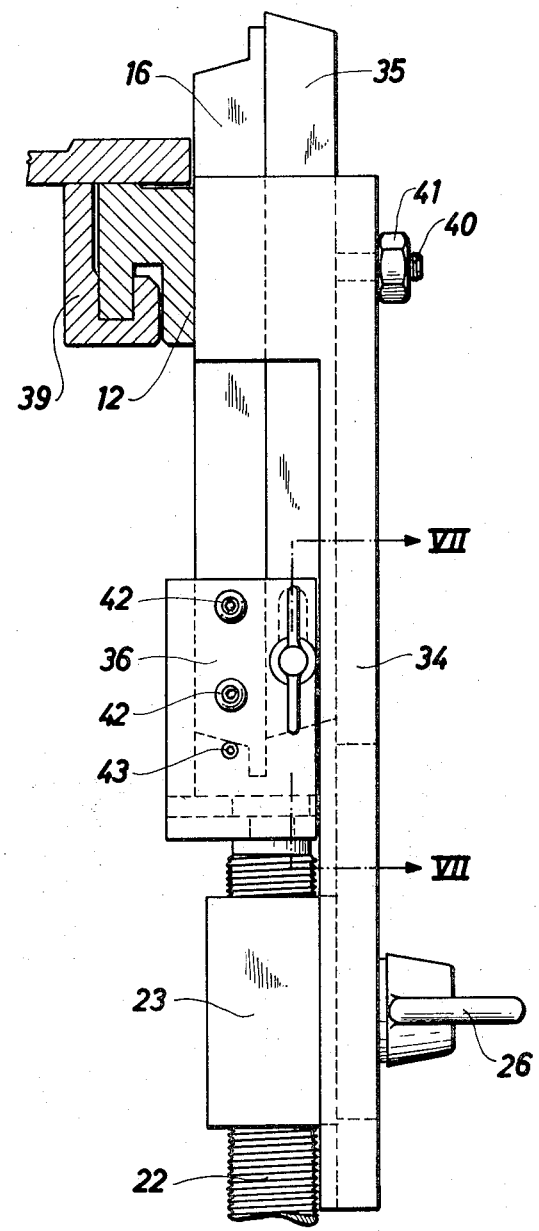
Figure 7:
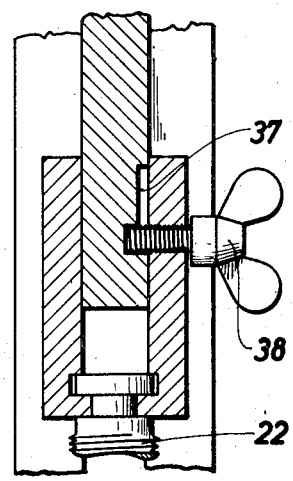

A device or tool made according to the invention and intended to be used as a combined cutting and bevelling tool will be described herebelow with reference to the accompanying drawings in which FIG. 1 is a perspective view of the device, FIG. 2 is a side view from the side of the device which is not shown in FIG. 1, FIG. 3 is a section taken on the line III—III in FIG. 2, FIG. 4 is a section along the line IV—IV in FIG. 2, FIG. 5 is a perspective view of an insert piece forming part of the device, FIG. 6 illustrates a portion of the device according to a modified embodiment and FIG. 7 is a section taken on the line VII—VII in FIG. 6.

In the drawings numeral 1 indicates as a whole a clamping member adapted to be attached around the work piece. The work piece is not shown in the drawings. Numeral 2 indicates as a whole a cutting tool which is movably carried in the clamping member 1 by means of a guide as will be more specifically described herebelow. The clamping member 1 comprises an upper half 3 and a lower half 4 which are interconnected at one edge by means of a hinge 5. The clamping member is subdivided into the two halves along a plane through the longitudinal center axis of the work piece. Numeral 6 indicates as a whole a device for locking the upper and lower halves 3 and 4 respectively in the operating position, illustrated in FIGS. 1 and 2. This locking device comprises a pin 7 which has one end connected to the lower half 3 by means of a hinge 8, a T-shaped spindle 9 in threaded engagement with the pin 7 and a forkshaped abutment 10 projecting from the upper half 3.

By screwing the spindle 9 down onto the pin 7 the abutment portion 10 and thereby the upper half 3 will be pressed towards the lower half 4. The clamping member 1 may be attached to a work bench or the like by means of a support indicated at 11.

The cutting tool 2 comprises a carrier 12 and a tool block 13 which are attached to the carrier 12 by means of screws 14 and guide pins 15 and supports a cutterbit 16. The guide pins 15 prevent the tool block from turning relative to the carrier 12. An adjusting screw 19 is threaded in the tool block 13 and is attachable against the cutterbit 16 in order to eliminate play between the cutterbit and its guide. The adjusting screw 19 can be locked in a desired position by a locking nut 17. As shown in the drawings the carrier 12 is mounted in one side portion of the clamping member 1 in such a manner that the cutter bit 16 may be moved in the circumferential direction of the work piece. As will appear from FIG. 3 the carrier 12 is provided with a rail 18 which engages in a corresponding groove in the clamping member 1. In the embodiment illustrated in FIG. 3 the rail 18 and the groove in the clamping member are shown as a substantially L-shaped cross section. As will be evident from FIG. 1 the carrier 12 has a smaller extension in the circumferential direction of the clamping member than the lower half 4 of the clamping member for the purpose of facilitating the swinging away of the upper half when the clamping member is opened. As illustrated in FIG. 4 the tool block 13 is made with a rectangular groove in which the cutterbit 16 is displaceably carried. Numeral 20 indicates a driver dog which is secured to the cutterbit 16 by means of screws 21 and wherein a feed screw 22 has one end portion rotatably and axially non displaceably carried. The feed screw 22 is in threaded engagement with a coarse adjustment member 23 slideably mounted on the tool block 13 by means of a screw pin 24 projecting through a longitudinal slot 25 in the tool block and a locking wing nut 26.

An insert piece 27 illustrated in FIG. 5 and also indicated in broken lines in FIG. 2 is intended to be used when cutting work pieces with smaller diameter than the inner diameter of the clamping member. The insert piece 27 comprises two halves each of which in turn consists of two side portions 28 which are interconnected by means of a cross member 29. Numeral 30 indicates a guiding pin which when the insert half 27 is placed in the clamping member will project into a corresponding opening in the clamping member. The upper part of the insert halves is held in position by a U-shaped spring 31 mounted on the outside of the upper half 3 of the clamping member by means of a screw 32. The legs of said spring are clamped against a conical portion of the guiding pin 30. As will appear from FIGS. 1 and 2 the outer diameter of the side members 28 corresponds to the inner diameter of the clamping member whereas the diameter of the inner opening 33 corresponds to the outer diameter of the work piece. It is, of course, also possible to make the insert halves 27 as solid pieces without departing from the basic idea of this invention but the embodiment shown is preferred in view of lighter weight and easiness of handling.

The embodiment illustrated in FIGS. 6 and 7 differs from the embodiment of FIGS. 1 - 4 inclusively, in that the tool block 34 apart from the cutterbit 16 also carries a bevelling tool 35. A driver dog 36 is attached by means of screws 37 and a guide pin 38 to the cutter tool 16 and the feed screw 22 has one end portion rotatably and axially non displaceable carried therein. According to the invention the bevelling tool 35 is adapted to be removable from the position shown in FIG. 6 and to be moved backwards in the tool block 34. For this purpose the cutter may be provided with a recess 37 which is stepped in the longitudinal direction of the tool and in which projects a locking screw 38. In the position illustrated in FIG. 7 the cutter 35 is locked in its front position. By screwing out the screw 38, the cutter 35 will be allowed to slide backwards until the front edge of the recess 37 abuts against the screw. Just as in the previously described embodiment the tool block 34 is attached to a guide rail 39 by means of screws and guide pins (not shown) corresponding to the screws 14 and pins 15 in FIG. 2. Also an adjusting screw 40 and a locking nut 41 is threaded in the tool block 34 just as in the previously described embodiment. The guide rail 39 engages with a flange like edge portion of the carrier 12.

The device illustrated in FIGS. 1 – 5 inclusively is used in the following manner: The spindle 6 is screwed to move up the pin 7 whereupon the upper half 3 of the clamping member 1 may be raised from the lower half 4 so that the work piece which is to be cut will be inserted in the opening of the clamping member. If the work piece has an outer diameter corresponding to the inner diameter of the clamping member 1 and the insert piece 27 will not be necessary but if the diameter of the work piece is smaller, a suitable insert piece 27 with an inner diameter corresponding to the outer diameter of the work piece may be used. The work piece is clamped by means of the spindle 6 in the clamping member whereafter the coarse adjustment member 23 is pushed along the block 13 until the cutter 16 will contact the work piece, whereafter the adjustment member is locked to said block by means of the wing nut 26 and the cutter 16 is moved in the circumferential direction of the work piece while being fed forward by means of feed screws 22. When the front portion of the cutter edge of the cutter bit 16 has reached through the work piece the top portion of the cutting edge has also performed a bevelling of the edge of the work piece adjacent the cut. After loosening of the spindle 6 the spindle may be swung in clockwise direction according to FIG. 1, disengaging the spindle from the fork shaped abutment portion 10. This may be made for instance when the insert 27 is to be changed.

The device shown in FIGS. 6 and 7 may be used in the following manner: After the work piece has been clamped and after the coarse adjustment, the cutterbits 16 and 35 are moved in the circumferential direction of the work piece while being pressed forwardly by means of the feed screws 22 with the cutters in the relative positions as illustrated in FIG. 6. Before the tool 35 has cut through the work piece, it is released by screwing out the screw 38 so far that it may engage the shallower portion of the recess 37. The cutting action of the tool 35 is then discontinued whereas the cutting is completed by the cutter bit 16. In this manner both edges of the work piece adjacent the cut will be bevelled.

The invention is not limited to the embodiments which have been described hereinbefore and shown in the drawings as examples only, said embodiments being capable of modifications within the scope of the appended claims without departing from the spirit of the invention.

What I claim is:

1. A device for cutting tubular work pieces and comprising in combination a clamping member for surrounding and clamping the work piece, said clamping member having two semi-cylinderical halves with cylindrical inner surfaces capable of pressing against the outer surface of the work piece in the operation position of said clamping member, said clamping member halves being pivotally interconnected at one of their corresponding edges, means for clamping said halves together at the opposite edges thereof, said halves having radially extending flange portions at one end, the front side of said flange portions having an undercut circular groove, a curved tool carrier having an extension in the circumferential direction of the work piece smaller than each of said halves of the clamping member and having a guide list portion running in said undercut groove, a radially extending tool block secured to said tool carrier, a cutter bit, means for moving said cutter bit along said tool block substantially towards the center of the work piece, each of said semi-cylindrical halves being divided into an outer piece and an insert piece which is detachably mounted in said halves for adapting the device to work with smaller diameter than the inner diameter of said outer piece, at least the upper one of said insert pieces having a guiding pin extending radially through an opening in the outer piece, and said guide pin is releaseably lockable at the side of said outer piece.

2. A device as claimed in claim 1 wherein the means for locking said guide pin consists of a spring which is pressed by its spring action against an angled side of a portion of said guide pin projecting in the outer piece of said clamping half.

* * * * *